United States Patent
Ozturk et al.

(10) Patent No.: US 9,918,251 B2
(45) Date of Patent: Mar. 13, 2018

(54) TECHNIQUES FOR DYNAMICALLY SPLITTING BEARERS BETWEEN VARIOUS RADIO ACCESS TECHNOLOGIES (RATS)

(71) Applicant: QUALCOMM Incorporated, San Diego, CA (US)

(72) Inventors: Ozcan Ozturk, San Diego, CA (US); Ajay Gupta, San Diego, CA (US); Gavin Bernard Horn, La Jolla, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 14/578,234

(22) Filed: Dec. 19, 2014

(65) Prior Publication Data

US 2015/0189551 A1 Jul. 2, 2015

Related U.S. Application Data

(60) Provisional application No. 61/922,738, filed on Dec. 31, 2013.

(51) Int. Cl.
| | |
|---|---|
| *G01R 31/08* | (2006.01) |
| *G06F 11/00* | (2006.01) |
| *H04J 1/16* | (2006.01) |
| *H04W 28/08* | (2009.01) |
| *H04W 28/02* | (2009.01) |
| *H04B 7/024* | (2017.01) |
| *H04W 88/06* | (2009.01) |

(52) U.S. Cl.
CPC .......... *H04W 28/085* (2013.01); *H04B 7/024* (2013.01); *H04W 28/0273* (2013.01); *H04W 28/08* (2013.01); *H04W 88/06* (2013.01)

(58) Field of Classification Search
CPC .......................... H04W 28/08; H04W 28/085
See application file for complete search history.

(56) References Cited

U.S. PATENT DOCUMENTS

| | | | | |
|---|---|---|---|---|
| 9,226,206 | B2 * | 12/2015 | Ishii | ...................... H04W 8/082 |
| 2010/0003990 | A1 * | 1/2010 | Suemitsu | .............. H04W 72/02 |
| | | | | 455/442 |

(Continued)

FOREIGN PATENT DOCUMENTS

| | | |
|---|---|---|
| WO | 2005055524 A1 | 6/2005 |
| WO | 2013153442 A1 | 10/2013 |

OTHER PUBLICATIONS

Intel (3GPP, R2-131401, "impacts of splitting a single EPS bearer between two (or more) eNBs", Chicago, Apr. 15-19, 2013).*

(Continued)

*Primary Examiner* — Maharishi Khirodhar
(74) *Attorney, Agent, or Firm* — Dalei Dong

(57) ABSTRACT

A method, an apparatus, and a computer program product for wireless communication are provided. The apparatus determines a first fractional amount of a first data flow to be served to a UE via a first communication link using a first radio access technology (RAT), determines a second fractional amount of the first data flow to be served to the UE via a second communication link using a second RAT, and serves the first fractional amount of the first data flow to the UE using the first communication link.

30 Claims, 14 Drawing Sheets

(56) References Cited

U.S. PATENT DOCUMENTS

| | | | |
|---|---|---|---|
| 2012/0002543 A1* | 1/2012 | Dighe | H04L 47/125 370/232 |
| 2012/0188949 A1 | 7/2012 | Salkintzis et al. | |
| 2013/0021968 A1* | 1/2013 | Reznik | H04W 36/026 370/328 |
| 2013/0083783 A1* | 4/2013 | Gupta | H04W 28/0215 370/338 |
| 2013/0132604 A1 | 5/2013 | Cohen et al. | |
| 2013/0244640 A1* | 9/2013 | Viorel | H04W 56/0005 455/422.1 |
| 2013/0322238 A1* | 12/2013 | Sirotkin | H04W 28/0247 370/230 |
| 2014/0003239 A1* | 1/2014 | Etemad | H04W 28/08 370/235 |
| 2014/0094186 A1* | 4/2014 | Barberis | H04W 24/02 455/453 |
| 2014/0269632 A1* | 9/2014 | Blankenship | H04W 76/025 370/336 |
| 2015/0271706 A1* | 9/2015 | Baboescu | H04W 28/085 370/235 |
| 2015/0372922 A1* | 12/2015 | He | H04L 45/16 370/235 |

OTHER PUBLICATIONS

LG (R2-132849, Text proposal on WLAN 3GPP radio interworking solution 2, Barcelona, Spain, Aug. 19-Aug. 23, 2013, Meeting #83).*
International Search Report and Written Opinion—PCT/US2015/017469—ISA/EPO—dated Jun. 24, 2015.

* cited by examiner

TECHNIQUES FOR DYNAMICALLY SPLITTING BEARERS BETWEEN VARIOUS RADIO ACCESS TECHNOLOGIES (RATS)

CROSS-REFERENCE TO RELATED APPLICATION(S)

This application claims the benefit of U.S. Provisional Application Ser. No. 61/922,738, entitled "TECHNIQUES FOR DYNAMICALLY SPLITTING BEARERS BETWEEN VARIOUS RADIO ACCESS TECHNOLOGIES (RATS)" and filed on Dec. 31, 2013, which is expressly incorporated by reference herein in its entirety.

BACKGROUND

Field

The present disclosure relates generally to communication systems, and more particularly, to techniques for dynamically splitting bearers between various radio access technologies (RATs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Techniques for dynamically splitting bearers between various radio access technologies (RATs) are described herein. In an aspect of the disclosure, a method, a computer program product, and an apparatus are provided. The apparatus determines a first fractional amount of a first data flow to be served to a user equipment (UE) via a first communication link using a first RAT, determines a second fractional amount of the first data flow to be served to the UE via a second communication link using a second RAT, and serves the first fractional amount of the first data flow to the UE using the first communication link.

In an aspect, at least one of the first fractional amount of the first data flow or the second fractional amount of the first data flow is determined based on a configuration or an optimization function. In an aspect, the optimization function is based on at least one of an assignment of data flows to a communication link, a channel condition of each of the first RAT and the second RAT, a traffic condition of each of the first RAT and the second RAT, a resource of the first RAT and the second RAT, a channel load of the first communication link and the second communication link, or a difference between data rates and latencies on the first communication link and the second communication link.

In an aspect, the apparatus sends and receives control information for the first data flow to and from the UE via the first communication link using the first RAT, or sends and receives the control information for the first data flow to and from the UE via the second communication link using the second RAT. In an aspect, the control information includes at least one of radio resource control (RRC) messages for configuration of fractional transmissions on each of the first and second communication links, radio link control (RLC) messages, and Packet Data Convergence Protocol (PDCP) status messages.

In an aspect, the apparatus receives feedback information for the first data flow from the UE via the first communication link using the first RAT, receives feedback information for the first data flow from the UE via the second communication link using the second RAT, or receives feedback information for the first data flow from the second RAT. In an aspect, the feedback information includes at least one feedback message containing UE measurements and second RAT measurements. In an aspect, the first and second fractional amounts of the first data flow are based on an optimization of a system utility, which may use proportional fairness between bearers.

In an aspect, the apparatus determines a third fractional amount of a second data flow to be sent by the UE via the first communication link using the first RAT, determines a fourth fractional amount of the second data flow to be sent by the UE via the second communication link using the second RAT, and receives the third fractional amount of the second data flow from the UE via the first communication link. In an aspect, the first data flow includes downlink traffic and the second data flow includes uplink traffic.

In an aspect, the apparatus determines whether a channel quality is below a threshold, and updates the determined first, second, third and fourth fractional amounts when the channel quality is below the threshold.

In an aspect, the apparatus periodically evaluates the determination of the first and second fractional amounts of the first data flow. In an aspect, the apparatus periodically evaluates the determination of the third and fourth fractional amounts of the second data flow.

In an aspect, evaluation of the determination of the first and second fractional amounts of the first data flow, and the third and fourth fractional amounts of the second data flow includes at least one of optimizing a difference of effective data rates and latencies between the first and second RATs for a bearer served on both the first and second communication links, refraining from applying the determined first and second fractional amounts of the first data flow or the determined third and fourth fractional amounts of the second data flow when a prohibit timer is running, or refraining from applying the determined first and second fractional amounts of the first data flow and refraining from applying the determined third and fourth fractional amounts of the second data flow when a number of fractional allocation changes for a data flow exceeds a threshold within a certain time.

In an aspect, the apparatus transmits a message to the UE, where the message configures the UE to send the third fractional amount of the second data flow via the first communication link using the first RAT and to send the fourth fractional amount of the second data flow via the second communication link using the second RAT.

In an aspect, the apparatus implements the determined first and second fractional amounts of the first data flow and the determined third and fourth fractional amounts of the second data flow based on token bucket mechanisms maintained for the first and second communication links or based on a fraction probability.

In an aspect, the determination of the first fractional amount of the first data flow or determining the second fractional amount of the first data flow is based at least in part on a report from the UE. In an aspect, the determination of the first fractional amount of the first data flow or determination of the second fractional amount of the first data flow is performed dynamically for a period of time or based at least in part on a reception of a report from the UE. In an aspect, the determination of the first fractional amount of the first data flow is one and the determination of the second fractional amount of the first data flow is zero when a channel quality of the second communication link is below a threshold or when a lowest modulation and coding scheme (MCS) cannot be selected for the second communication link.

In an aspect of the disclosure, an apparatus for wireless communication includes means for determining a first fractional amount of a first data flow to be served to a UE via a first communication link using a first radio access technology (RAT), means for determining a second fractional amount of the first data flow to be served to the UE via a second communication link using a second RAT, and means for serving the first fractional amount of the first data flow to the UE using the first communication link.

In an aspect, at least one of the first fractional amount of the first data flow or the second fractional amount of the first data flow is determined based on a configuration or an optimization function.

In an aspect, the optimization function is based on at least one of an assignment of data flows to a communication link, a channel condition of each of the first RAT and the second RAT, a traffic condition of each of the first RAT and the second RAT, a resource of the first RAT and the second RAT, a channel load of the first communication link and the second communication link, or a difference between data rates and latencies on the first communication link and the second communication link.

In an aspect, the apparatus further includes means for sending and receiving control information for the first data flow to and from the UE via the first communication link using the first RAT, or means for sending and receiving the control information for the first data flow to and from the UE via the second communication link using the second RAT. In an aspect, the control information includes at least one of RRC messages for configuration of fractional transmissions on each of the first and second communication links, RLC messages, and PDCP status messages.

In an aspect, the apparatus further includes means for receiving feedback information for the first data flow from the UE via the first communication link using the first RAT, means for receiving feedback information for the first data flow from the UE via the second communication link using the second RAT, or means for receiving feedback information for the first data flow from the second RAT. In an aspect, the feedback information includes at least one feedback message containing UE measurements and second RAT measurements.

In an aspect, the first and second fractional amounts of the first data flow are based on an optimization of a system utility which may use proportional fairness between bearers.

In an aspect, the apparatus further includes means for determining a third fractional amount of a second data flow to be sent by the UE via the first communication link using the first RAT, means for determining a fourth fractional amount of the second data flow to be sent by the UE via the second communication link using the second RAT, means for receiving the third fractional amount of the second data flow from the UE via the first communication link. In an aspect, the first data flow includes downlink traffic and the second data flow includes uplink traffic.

In an aspect, the apparatus further includes means for determining whether a channel quality is below a threshold, and means for updating the determined first, second, third and fourth fractional amounts when the channel quality is below the threshold.

In an aspect, the apparatus further includes means for periodically evaluating the determination of the first and second fractional amounts of the first data flow.

In an aspect, the apparatus further includes means for periodically evaluating the determination of the third and fourth fractional amounts of the second data flow. In an aspect, the means for periodically evaluating the determination of the first and second fractional amounts of the first data flow, and the third and fourth fractional amounts of the second data flow is configured to at least one of optimize a difference of effective data rates and latencies between the first and second RATs for a bearer served on both the first and second communication links, refrain from applying the determined first and second fractional amounts of the first data flow or the determined third and fourth fractional amounts of the second data flow when a prohibit timer is running, or refrain from applying the determined first and second fractional amounts of the first data flow and refraining from applying the determined third and fourth fractional amounts of the second data flow when a number of fractional allocation changes for a data flow exceeds a threshold within a certain time.

In an aspect, the apparatus further includes means for transmitting a message to the UE, where the message configures the UE to send the third fractional amount of the second data flow via the first communication link using the first RAT and to send the fourth fractional amount of the second data flow via the second communication link using the second RAT.

In an aspect, the apparatus further includes means for implementing the determined first and second fractional amounts of the first data flow and the determined third and fourth fractional amounts of the second data flow based on token bucket mechanisms maintained for the first and second communication links or based on a fraction probability.

In an aspect, the means for determining the first fractional amount of the first data flow or the means for determining the second fractional amount of the first data flow is configured to perform a determination based at least in part on a report from the UE.

In an aspect, the means for determining the first fractional amount of the first data flow or determining the second fractional amount of the first data flow is configured to dynamically perform a determination for a period of time or based at least in part on a reception of a report from the UE.

In an aspect, the determination of the first fractional amount of the first data flow is one and the determination of the second fractional amount of the first data flow is zero when a channel quality of the second communication link is below a threshold or when a lowest MCS cannot be selected for the second communication link.

In an aspect of the disclosure, an apparatus for wireless communication includes a memory, and at least one processor coupled to the memory and configured to determine a first fractional amount of a first data flow to be served to a UE via a first communication link using a first RAT, determine a second fractional amount of the first data flow to be served to the UE via a second communication link using a second RAT, and serve the first fractional amount of the first data flow to the UE using the first communication link.

In an aspect of the disclosure, a computer program product includes a computer-readable medium including code for determining a first fractional amount of a first data flow to be served to a UE via a first communication link using a first RAT, determining a second fractional amount of the first data flow to be served to the UE via a second communication link using a second RAT, and serving the first fractional amount of the first data flow to the UE using the first communication link.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

DETAILED DESCRIPTION

Figure 1:
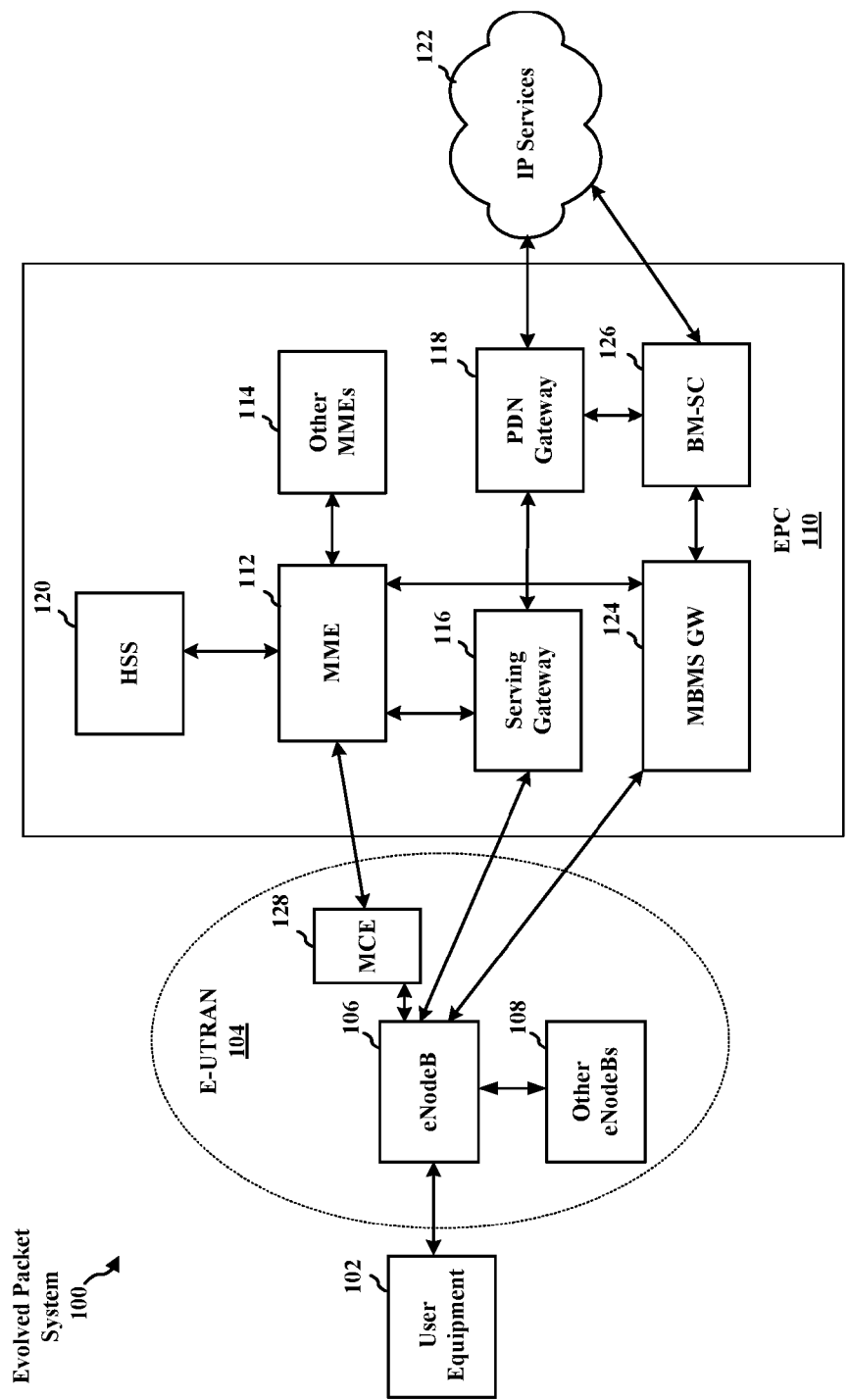
FIG. 1 is a diagram illustrating an example of a network architecture in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100 in accordance with various aspects of the present disclosure. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS 100 can interconnect with other access networks, but for simplicity those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN 104 includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
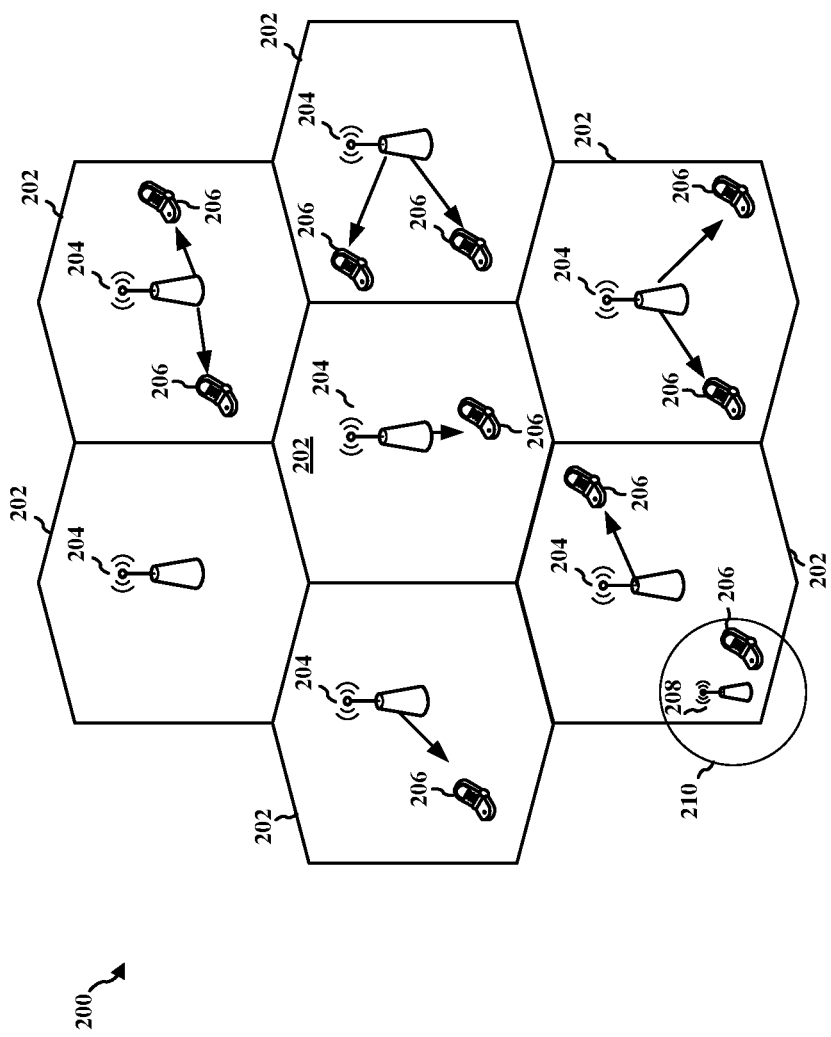
FIG. 2 is a diagram illustrating an example of an access network in accordance with various aspects of the present disclosure.

FIG. 2 is a diagram illustrating an example of an access network 200 in an LTE network architecture in accordance with various aspects of the present disclosure. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi- MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
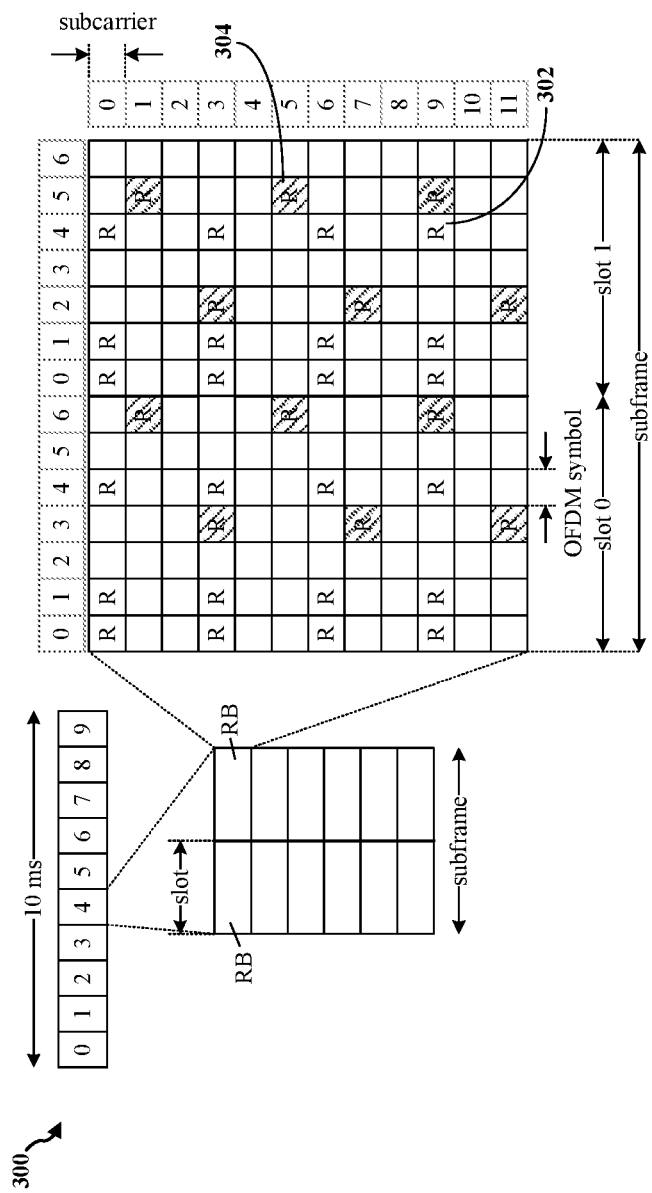
FIG. 3 is a diagram illustrating an example of a DL frame structure in LTE in accordance with various aspects of the present disclosure.

FIG. 3 is a diagram 300 illustrating an example of a DL frame structure in LTE in accordance with various aspects of the present disclosure. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
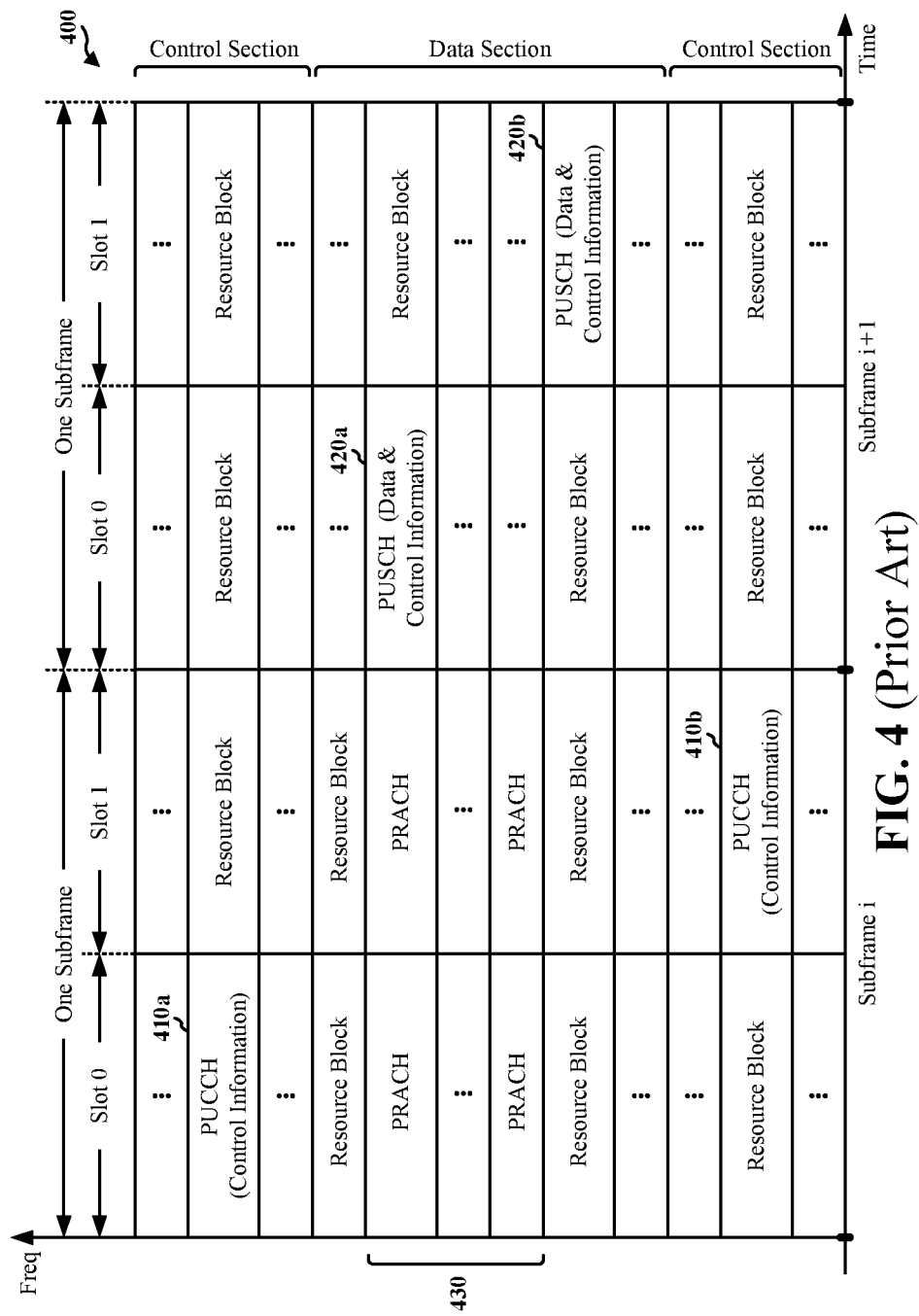
FIG. 4 is a diagram illustrating an example of an UL frame structure in LTE in accordance with various aspects of the present disclosure.

FIG. 4 is a diagram 400 illustrating an example of an UL frame structure in LTE in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
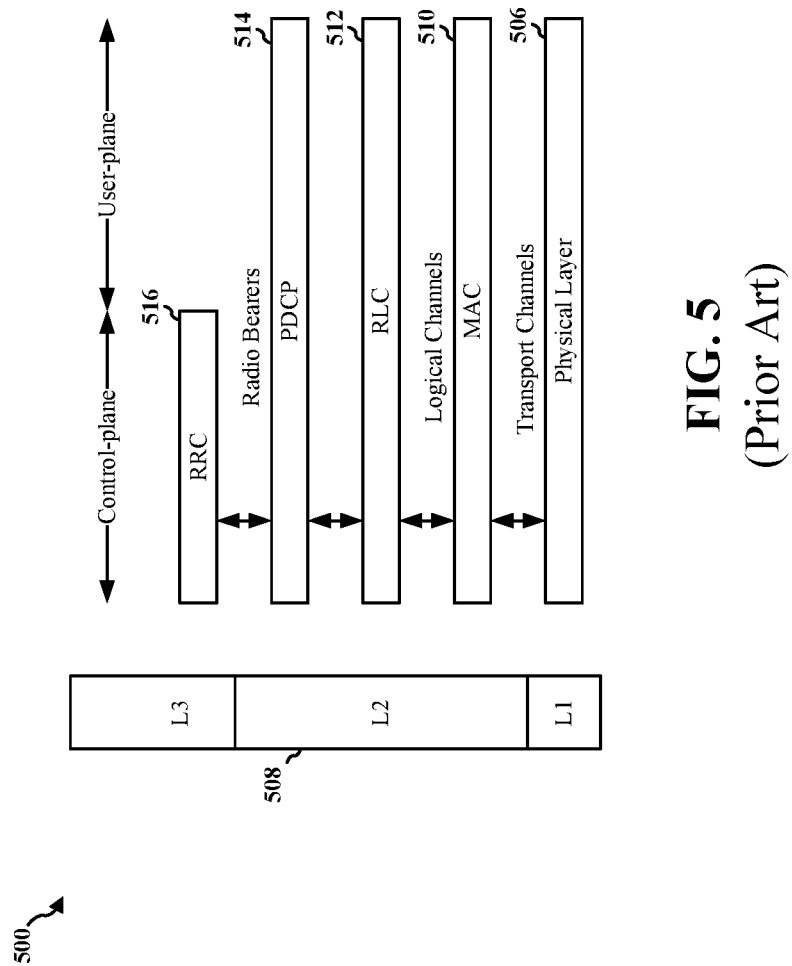
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
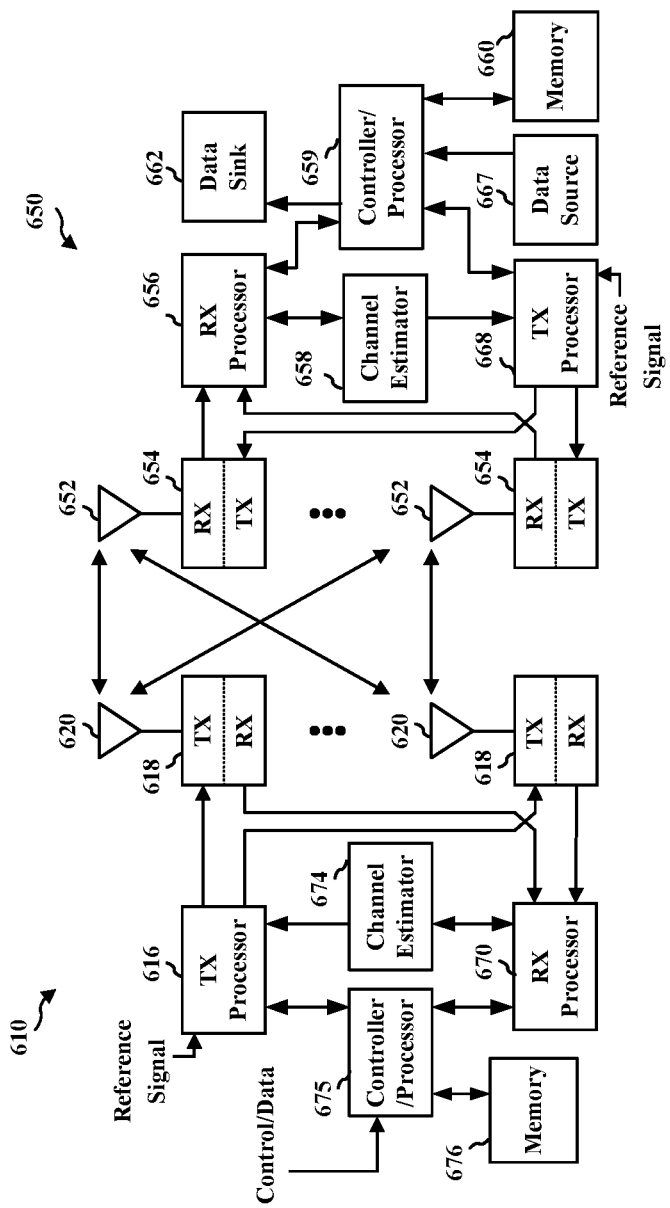
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
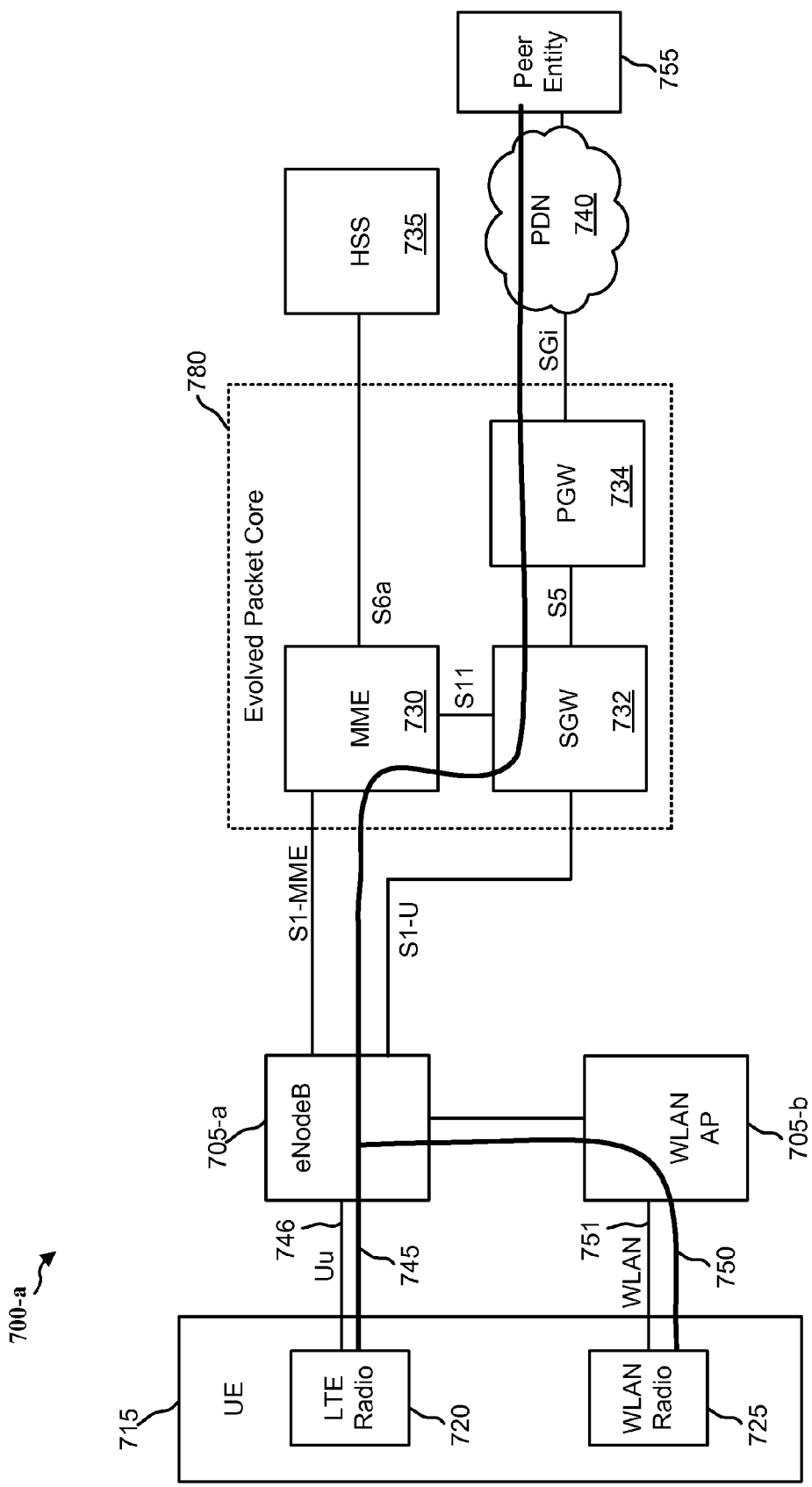
FIG. 7A is a diagram of a wireless communication system illustrating an example of data paths between a UE and a PDN in accordance with various aspects of the present disclosure.

FIG. 7A is a diagram of a wireless communication system 700-*a* illustrating an example of data paths 745 and 750 between a UE 715 and a PDN 740 (e.g., Internet) in accordance with an aspect of the present disclosure. In an aspect, the data paths 745 and 750 are configured to enable aggregation of data from WWAN and WLAN radio access technologies (RATs). As shown in FIG. 7A, the wireless communication system 700-*a* may include the UE 715 (also referred to as a multi-mode UE 715), an eNB 705-*a*, a WLAN AP 705-*b*, an evolved packet core (EPC) 780, a PDN 740, and a peer entity 755. The EPC 780 may include a mobility management entity (MME) 730, a serving gateway (SGW) 732, and a PDN gateway (PGW) 734. A home subscriber system (HSS) 735 may be communicatively coupled with the MME 730. The UE 715 may include an LTE radio 720 and a WLAN radio 725.

The eNB 705-*a* and WLAN AP 705-*b* may be collocated or otherwise in high-speed communication (e.g., via a fiber connection) with each other. In the configuration of FIG. 7A, EPS bearer-related data between the UE 715 and the WLAN AP 705-*b* may be routed to the EPC 780 through the eNB 705-*a*. In this way, all EPS bearer-related data may be forwarded along the same path between the eNB 705-*a*, the EPC 780, the PDN 740, and the peer entity 755.

As shown in FIG. 7A, the eNB 705-*a* and the WLAN AP 705-*b* may be capable of providing the UE 715 with access to the PDN 740 using the aggregation of one or more LTE component carriers or one or more WLAN component carriers. Using this access to the PDN 740, the UE 715 may communicate with the peer entity 755.

The MME 730 may be the control node that processes the signaling between the UE 715 and the EPC 780. Generally, the MME 730 may provide bearer and connection management. The MME 730 may, therefore, be responsible for idle mode UE tracking and paging, bearer activation and deactivation, and SGW selection for the UE 715. The MME 730 may communicate with the eNB 705-*a* over an S1-MME interface. The MME 730 may additionally authenticate the UE 715 and implement Non-Access Stratum (NAS) signaling with the UE 715.

The HSS 735 may, among other functions, store subscriber data, manage roaming restrictions, manage accessible access point names (APNs) for a subscriber, and associate subscribers with MME 730. The HSS 735 may communicate with the MME 730 over an S6a interface defined by the Evolved Packet System (EPS) architecture standardized by the 3GPP organization.

As shown in FIG. 7A, the SGW 732 may be connected to the MME 730 over an S11 signaling interface and may be connected to the PDN gateway 734 over an S5 signaling interface. All user IP packets transmitted over LTE may be transferred through the eNB 705-*a* to the SGW 732 through the MME 730. The SGW 732 may reside in the user plane and act as a mobility anchor for inter-eNB handovers and handovers between different access technologies. The PDN gateway 734 may provide UE IP address allocation as well as other functions.

The PDN gateway 734 may provide connectivity to one or more external packet data networks, such as PDN 740, over an SGi signaling interface. The PDN 740 may include the Internet, an Intranet, an IP Multimedia Subsystem (IMS), a Packet-Switched (PS) Streaming Service (PSS), and/or other types of PDNs.

In the present example, user plane data between the UE 715 and the EPC 780 may traverse the same set of one or more EPS bearers, irrespective of whether the traffic flows over data path 745 of the LTE link or data path 750 of the WLAN link. Signaling or control plane data related to the set of one or more EPS bearers may be transmitted between the LTE radio 720 of the UE 715 and the MME 730 of the EPC 780, by way of the eNB 705-*a*.

As shown in FIG. 7A, the UE is simultaneously connected to the eNB 705-*a* and the WLAN AP 705-*b*, which provide radio access links to transport a user's signaling and data traffic. Therefore, in the aspect of FIG. 7A, a user's data or signaling bearer may be served by either LTE or WLAN radio links.

Figure 7B:
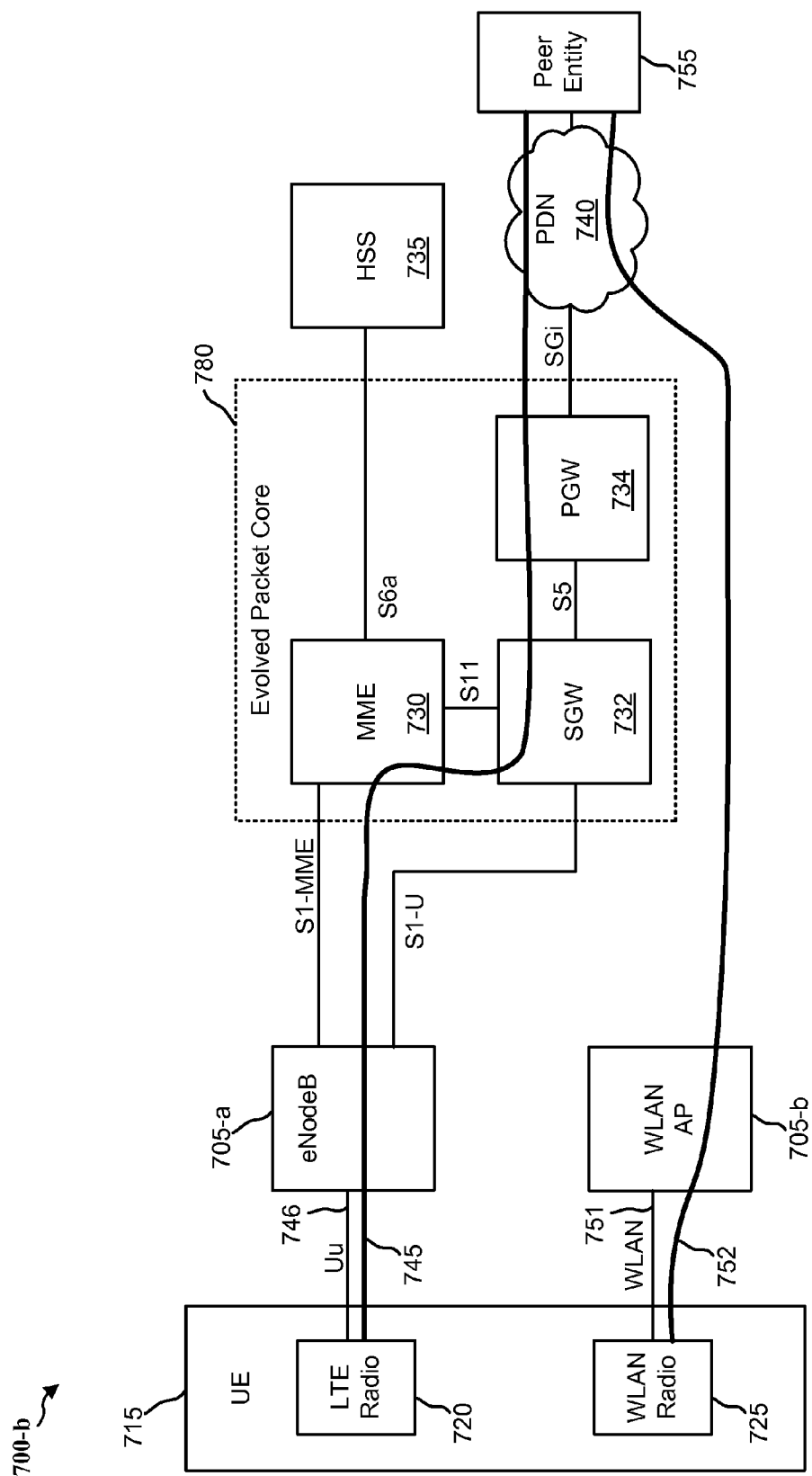
FIG. 7B is a diagram of a wireless communication system illustrating an example of data paths between a UE and a PDN in accordance with various aspects of the present disclosure.

FIG. 7B is a diagram of a wireless communication system 700-*b* illustrating an example of data paths 745 and 752 between the UE 715 and the PDN 740 in accordance with an aspect of the present disclosure. The data paths 745 and 752 are shown within the context of a wireless communication system 700-*b* for aggregating data from WLAN and WWAN radio access technologies, which is substantially similar to the wireless communication system 700-*a* of FIG. 7A. As shown in the configuration of FIG. 7B, the eNB 705-*a* and WLAN AP 705-*b* in FIG. 7B may not be collocated or may not otherwise be in communication with each other.

In an aspect, the eNB 705-*a* may determine an amount of a bearers' data traffic (also referred to as a data flow) to be served on each communication link. In an aspect, the amount of the data flow to be served on each communication link may be a fractional amount of the data flow and may be based on a system optimization. For example, the eNB 705-*a* may determine to serve 75% of the data flow to the UE 715 over data path 752 of the WLAN link 751 and 25% of the data flow over data path 745 of the WWAN link 746. In an aspect, the WWAN link 746 may be an LTE link and WLAN link 751 may be a Wi-Fi Link.

In an aspect, a bearer of the UE 715 may include a DL bearer for carrying a data flow in the DL direction and a UL bearer for carrying a data flow in the UL direction. In an aspect, the eNB 705-*a* may determine an amount of a data flow that the UE 715 is to transmit on each communication link and may transmit one or more messages that configure the UL bearer for the UE 715. For example, the one or more messages may configure the UL bearer by indicating that the UE is to transmit 30% of the data flow in the UL direction using the WLAN link 751 and 70% of the data flow using the WWAN link 746. In an aspect, such messages may be transmitted to the UE 715 using an RRC protocol. In an aspect, the eNB 705-*a* may not send one or more messages that configure the UL bearer of the UE 715 if the UE 715 is configured to send UL transmissions via one access link (e.g., WWAN link 746 or WLAN link 751).

In an aspect, the one or more messages that configure the UL bearer of the UE 715 may further indicate the determination of an amount of a data flow to be served to the UE 715 (e.g., in the DL direction) on each communication link. For example, if the eNB 705-*a* determines that all of the DL bearer traffic is to be served on one communication link (e.g., the WWAN link 746 over data path 745), the UE 715 may avoid monitoring the other communication link (e.g., the WLAN link 751) resulting in power savings for the UE 715.

In an aspect, each radio bearer for the UE 715 may be configured to carry a data flow from the eNB 705-*a* to the UE 715 in DL transmissions and to carry a data flow from the UE 715 to the eNB 705-*a* in UL transmissions. In an aspect, the fractional amounts of the data flow to be served to the UE 715 in DL transmissions may be the same as the fractional amounts of the data flow to be received from the UE 715 in UL transmissions. In another aspect, the fractional amounts of the data flow to be served to the UE 715 in DL transmissions may be different than the fractional amounts of the data flow to be received from the UE 715 in UL transmissions.

When the UE 715 is operating in an RLC Acknowledged Mode (AM), the DL data flow carried by a bearer may include feedback messages for the UL data flow carried by the bearer, and the UL data flow carried by the bearer may include feedback and/or control messages for the DL data flow carried by the bearer. In an aspect, such feedback and/or control messages may be delivered using the WWAN link 746 without using the WLAN link 751, or using the WLAN link 751 without using the WWAN link 746. For example, the eNB 705-*a* may be configured to transmit fractional amounts of the data flow to the UE 715 over the WWAN link 746 and the WLAN link 751 and may be configured to transmit a bearer's feedback and/or control messages using the WWAN link 746 without using the WLAN link 751. As another example, when the feedback and/or control messages are delivered on the WLAN link 751, the bearer's feedback and/or control messages may be sent from the WLAN AP 705-*b* to the eNB 705-*a* when transmitted from the UE 715, and from the eNB 705-*a* to the WLAN AP 705-*b* when transmitted from the eNB 705-*a*.

In an aspect, the eNB 705-*a* may determine a fractional amount of a data flow to be served to the UE 715 over data path 745 of the WWAN link 746 and a fractional amount of the data flow to be served to the UE 715 over data path 750 of the WLAN link 751 based on one or more statistics collected on the WWAN and WLAN links. For example, the statistics collected for the WWAN link 746 may include: a CQI and MCS for each UE being served by the eNB 705-*a*, DL buffer sizes per bearer and a UL buffer status report from each UE, the total radio resource utilization (e.g., frequency and/or time components of a WWAN resource) and the radio resource utilization per user, and/or hardware and backhaul loading for the WWAN. For example, the statistics collected for the WLAN link 751 may include: an MCS and a received signal strength indication (RSSI) per UE; transmitted and received traffic, failed and dropped packets, and retry attempts; the channel load for the WLAN AP 705-*b*; the total radio resource utilization (e.g., time component of a WLAN resource) and the radio resource utilization per user, and/or hardware and backhaul loading for the WLAN.

In an aspect, the eNB 705-*a* may determine the fractional amounts of the data flow to be served to the UE 715 over the WWAN link 746 and the WLAN link 751 for each of one or more time periods. For example, each of the one or more time periods may be approximately one second or other suitable time period. For example, the one or more time periods may be the same duration or of different durations. In another aspect, the eNB 705-*a* may determine the fractional amounts of the data flow to be served to the UE 715 over the WWAN link 746 and WLAN link 751 based on a condition or an event, thereby allowing the eNB 705-*a* to rapidly react to poor channel conditions instead of waiting for a time period in which the fractional amounts are to be updated. For example, when the RSSI for the WLAN link 751 is less than a threshold or if the WLAN AP 705-*b* cannot select the lowest MCS during a time interval, the eNB 705-*a* may determine to serve a data flow to the UE 715 entirely over the WWAN link 746. In such example, the eNB 705-*a* may determine the fractional amount of the data flow to be served to the UE 715 over the WLAN link 751 to be zero.

In an aspect, the eNB 705-*a* may determine the fractional amounts of the data flow to be served to the UE 715 over the WWAN link 746 and WLAN link 751 based on a system optimization. For example, the system optimization may be configured to maximize the total system utility for the links (e.g., WWAN link 746 and WLAN link 751) available in the wireless communication system 700-*a*. In an aspect, the eNB 705-*a* may perform such system optimization iteratively. The eNB 705-*a* may use a proportional fairness (PF) metric to achieve fairness when allocating the fractional amounts of a data flow to be served to the UE 715 over the WWAN link 746 and WLAN link 751. In an aspect, the eNB 705-*a* may increase the total system utility by determining an allocation that maximizes the total system utility function F(S) as defined in equation (1):

$$F(S) = \Sigma_k \text{alpha\_}k(S\_k) * \text{beta\_}k * \Delta(X\_k)/X\_k \qquad \text{(equation 1)}$$

where S is a vector of S_k, X_k is a filtered value of the total throughput (e.g., bits per second) of bearer k up to the present time, and ΔX_k is the expected throughput (e.g., bits per second) for bearer k for a subsequent time period. For example, S_k is a number between zero and one representing the fractional amount of a data flow for a bearer k to be served on the WWAN link 746, alpha_k(S_k) is a function which incorporates the difference between the effective data rates on each link when S_k is used, and beta_k incorporates the difference between latency on each link. The terms alpha_k(S_k) and beta_k are used to optimize the difference between data rates and latencies on each link, thereby minimizing the impact of packet reordering at the upper layers. It should be noted that S indicates the assignment of each bearer to be served on either the WWAN link 746 or the WLAN link 751 (e.g., the fractional amounts of the data flow to be served on the WWAN link 746 and the WLAN link 751, such that S_k=0 corresponds to all bearer k being served on WLAN and S_k=1 corresponds to all bearer k being served on WWAN).

In another aspect, the eNB 705-*a* may increase the total system utility by determining an allocation that maximizes the total system utility function F(S) as defined in equation (2):

$$F(S) = \Sigma_k \text{alpha\_}k(S\_k) * \text{beta\_}k * \log(Y\_k) \qquad \text{(equation 2)}$$

where Y_k is the expected data rate for a bearer k. In an aspect, the eNB 705-*a* may estimate Y_k based on the data rates on each link (e.g., WWAN link 746 and WLAN link 751). For example, if Y'_k is defined to represent an LTE data rate and Y"_k is defined to represent the WLAN data rate, then the eNB 705-*a* may determine Y_k based on equation (3):

$$Y\_k = S\_k * Y'\_k + (1-S\_k) * Y''\_k. \qquad \text{(equation 3)}$$

In equations 1 through 3 discussed supra, the bearer index k applies to all the bearers in the system including bearers that are served on only one link by configuration. As such, the impact of all bearers may be incorporated in the system optimization. Furthermore, each bearer index k is associated with one directional link (e.g., UL or DL) and, therefore, UL and DL bearers may each be considered in the system optimization. For example, the total system utility function F(S) may be calculated for both uplink bears and downlink bearers.

In an aspect, the eNB 705-*a* may optimize the system utility function F(S) by incorporating the variations of priority assigned to each bearer on each link (e.g., WWAN link 746 and WLAN link 751). For example, the WWAN link 746 and WLAN link 751 may continue to offer QoS to bearers via packet scheduling. For example, if schedulers assign higher priority between different QoS classes of bearers, the function F(S) may be modified to incorporate such variation in priority.

In an aspect, the eNB 705-a may optimize the system utility function F(S) by incorporating the variations of the data rates on each link (e.g., WWAN link 746 and WLAN link 751), such that a similar delay and throughput may be maintained on each link. Therefore, the delay skew for packets served on each link may be minimized and the impact of re-ordering of packets at the upper layers may be reduced or avoided.

In an aspect, the search space for maximizing the function F(S) has a dimension defined as the total number of bearers. In such aspect, the eNB 705-a may exclude some of the total number of bearers based on one or more conditions, thereby reducing the dimension. For example, the conditions may include: (a) condition or event triggered bearer splitting (e.g., switching a bearer if one access link (e.g., WWAN link 746) is poor (e.g., below a threshold) while the other link (e.g., WLAN link 751) is acceptable), (b) bearers configured to use only the WWAN link 746 or only the WLAN link 751, (c) a prohibit timer of the bearer is running, and/or (d) splitting changes for more than a number of bearers at any instance (these do not include the switches in condition (a)).

For example, the eNB 705-a may define Ω to represent the search space of points S to evaluate F(S) based on the conditions (a) through (d) and may define Sc to be the point found as result of conditions (a) through (d). If Ω is empty, then the eNB 705-a may select this point as the optimal point for F(S). Otherwise, if Ω is not empty, the eNB 705-a may apply an optimization procedure to find the optimal point for F(S) to maximize total system utility.

For example, the eNB 705-a may apply an optimization procedure by defining a point S1, where S1=Sc. The eNB 705-a may then determine whether the number of points where F(S) has been evaluated is greater than the maximum number of evaluations allowed (e.g., due to computational requirements). If the number of points where F(S) has been evaluated is greater than the maximum number of evaluations allowed, the eNB 705-a ceases the optimization procedure. Otherwise, the eNB 705-a may rank various bearers based at least in part on an amount of expected system utility gained from splitting the bearers between WWAN link 746 and WLAN link 751. For example, the eNB may define k0 as the bearer where the most system utility gain is expected. In an aspect, the ranking for the system utility gain may be based on the following expression: (effective data rate delta between the WWAN link 746 and the WLAN link 751 for the current Sc)*(traffic volume for next interval)/(received throughput). The eNB 705-a may then define a point S2 as the point determined when all of bearer k0 is served on the link where gain is expected. The eNB 705-a may then determine the optimum value of α (referred to as α'), where 0≤α≤1 and where G(α)=F(α*S1+(1×α)*S2) is maximized. If G(α')>F(S1)+Delta1, then the eNB 705-a may define the point S1, such that S1=S2. The eNB 705-a may then return to the step of determining whether the number of points where F(S) has been evaluated is greater than the maximum number of evaluations allowed and continue to perform the optimization procedure as previously discussed.

The eNB 705-a may chose the point S1 for Sn if F(S1)/F(Sc)>Delta2. Otherwise, the eNB 705-a may select the point Sc and may define a point Snew, such that Snew=Sc. If there are bearers for which Snew and Sc are different (i.e. Snew_k is not equal to Sc_k), the eNB 705-a may apply and/or convey these changes to the UE 715.

In an aspect, the fractional amounts determined by the eNB 705-a for each bearer may be implemented by the eNB 705-a using a token bucket mechanism. In an aspect, the eNB 705-a may determine to serve a percentage (e.g., x %) of a data flow to the UE 715 via a first RAT (e.g., WWAN link 746) and to serve the remaining percentage (e.g., 100%−x %) of the data flow to the UE 715 via a second RAT (e.g., WLAN link 751). In such aspect, for each incoming data unit (e.g. bit or bytes), the eNB 705-a may collect x/100 data units in a token bucket for the first RAT while collecting 1−x/100 data units for the second RAT. When a packet of size s bits is scheduled on a RAT, this amount is removed from the respective token bucket. The packet scheduling on each RAT follows per its own MAC algorithm except that the token bucket level must be a non-negative value at all times.

Figure 8:
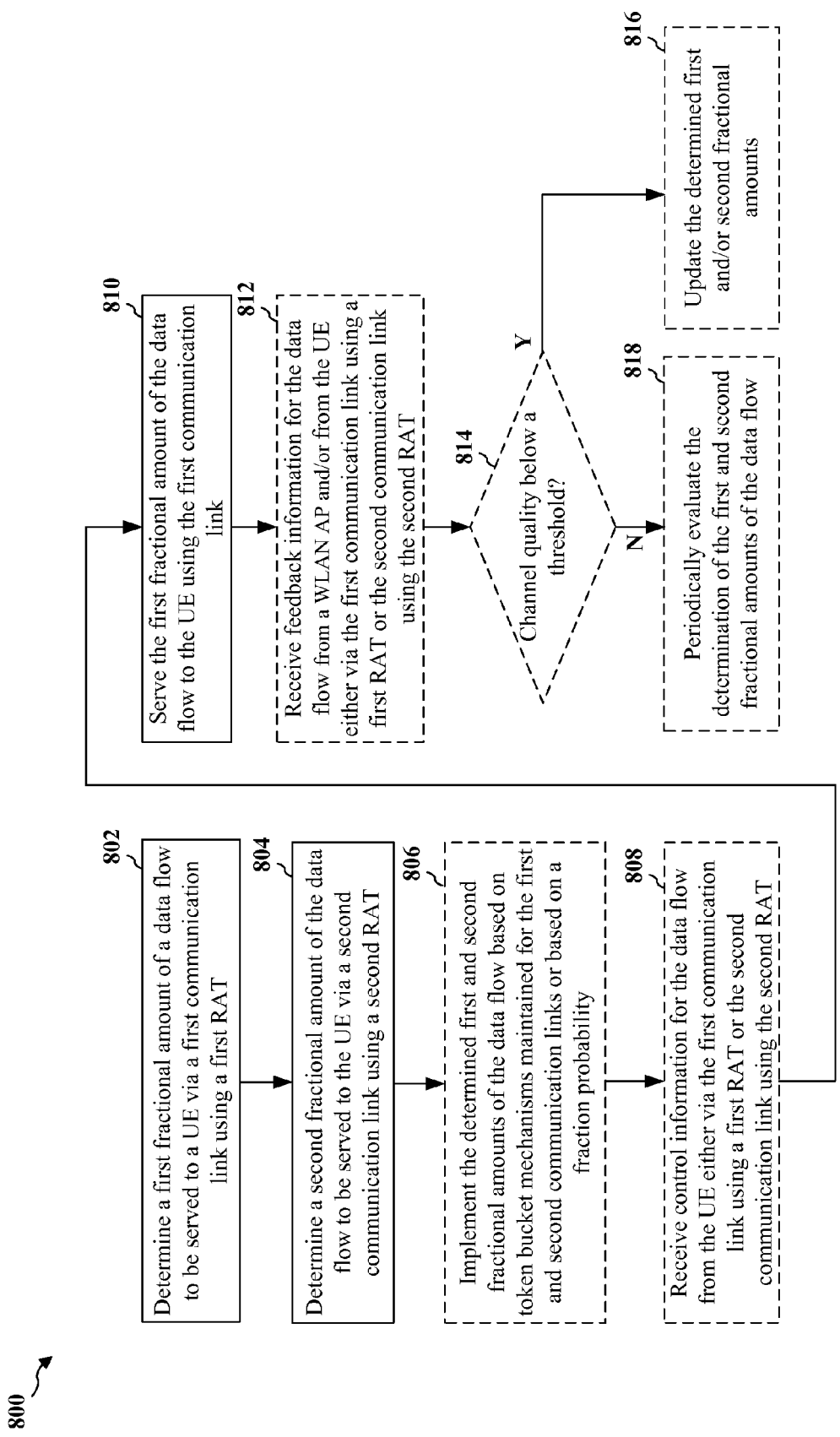
FIG. 8 is a flow chart of a method of wireless communication in accordance with various aspects of the present disclosure.

FIG. 8 is a flow chart 800 of a method of wireless communication in accordance with various aspects of the present disclosure. The method may be performed by an eNB, such as eNB 705-a in FIGS. 7A and 7B. It should be understood that the steps in the flowchart of FIG. 8 indicated with dotted lines represent optional steps.

At step 802, the eNB determines a first fractional amount of a data flow to be served to a UE (e.g., UE 715 in FIGS. 7A and 7B) via a first communication link using a first RAT. For example, the data flow may be a data service including one or more data packets to be delivered to the UE in DL transmissions and the first RAT may be a WWAN, such as LTE.

At step 804, the eNB determines a second fractional amount of the data flow to be served to the UE via a second communication link using a second RAT. For example, the second RAT may be a WLAN, such as WiFi™. In an aspect, the eNB determines the first fractional amount of the data flow or the second fractional amount of the data flow based on a configuration or an optimization function, such as the optimization functions shown in equations 1 and 2. In an aspect, the eNB determines the first fractional amount of the data flow or the second fractional amount of the data flow based at least in part on a report from the UE. In an aspect, the eNB determines the first fractional amount of the data flow or the second fractional amount of the data flow dynamically for a period of time or based at least in part on a reception of a report from the UE. In an aspect, the determination of the first fractional amount of the data flow is one and the determination of the second fractional amount of the data flow is zero when a channel quality of the second communication link is below a threshold or when a lowest MCS cannot be selected for the second communication link.

At step 806 the eNB implements the determined first and second fractional amounts of the data flow based on token bucket mechanisms maintained for the first and second communication links or based on a fraction probability.

At step 808, the eNB receives control information for the data flow from the UE either via the first communication link using the first RAT or the second communication link using the second RAT.

At step 810, the eNB serves the first fractional amount of the data flow to the UE using the first communication link.

At step 812, the eNB receives feedback information for the data flow from a WLAN AP (e.g., WLAN AP 705-b) and/or from the UE either via the first communication link using a first RAT or the second communication link using the second RAT.

At step 814, the eNB determines whether a channel quality is below a threshold. If the channel quality is below the threshold, the eNB updates the determined first and/or second fractional amounts in step 816. Otherwise, at step 818, the eNB periodically evaluates the determination of the first and second fractional amounts of the data flow. In an aspect, the evaluation of the determination of the first and second fractional amounts of the data flow is performed by refraining from applying the determined first and second fractional amounts of the data flow when a prohibit timer is running and/or by refraining from applying the determined first and second fractional amounts of the data flow when a number of fractional allocation changes for a data flow exceeds a threshold within a certain time.

Figure 9:
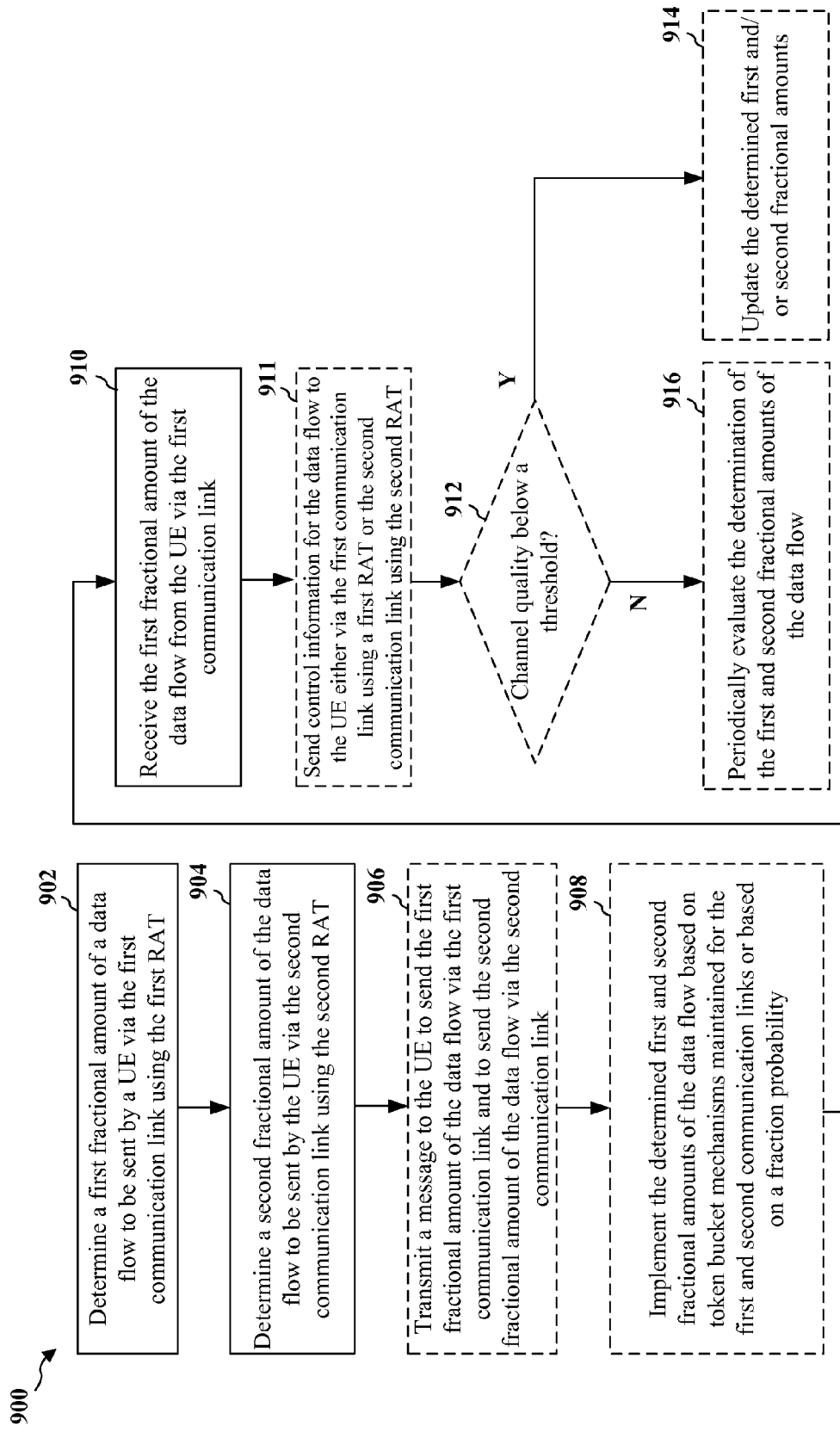
FIG. 9 is a flow chart of a method of wireless communication in accordance with various aspects of the present disclosure.

FIG. 9 is a flow chart 900 of a method of wireless communication in accordance with various aspects of the present disclosure. The method may be performed by an eNB, such as eNB 705-a in FIGS. 7A and 7B. It should be understood that the steps in the flowchart of FIG. 9 indicated with dotted lines represent optional steps.

At step 902, the eNB determines a first fractional amount of a data flow to be sent by a UE (e.g., UE 715 in FIGS. 7A and 7B) via a first communication link using a first RAT. For example, the first data flow may be data including one or more data packets to be delivered to the eNB in UL transmissions and the first RAT may be a WWAN, such as LTE.

At step 904, the eNB determines a second fractional amount of the data flow to be sent by the UE via a second communication link using a second RAT. For example, the second RAT may be a WLAN, such as WiFi™. In an aspect, the eNB determines the first fractional amount of the data flow or the second fractional amount of the data flow based on a configuration or an optimization function, such as the optimization functions shown in equations 1 and 2. In an aspect, the eNB determines the first fractional amount of the data flow or the second fractional amount of the data flow based at least in part on a report from the UE. In an aspect, the eNB determines the first fractional amount of the data flow or the second fractional amount of the data flow dynamically for a period of time or based at least in part on a reception of a report from the UE. In an aspect, the determination of the first fractional amount of the data flow is one and the determination of the second fractional amount of the data flow is zero when a channel quality of the second communication link is below a threshold or when a lowest MCS cannot be selected for the second communication link.

At step 906, the eNB transmits a message to the UE to send the first fractional amount of the data flow via the first communication link and to send the second fractional amount of the data flow via the second communication link.

At step 908 the eNB implements the determined first and second fractional amounts of the data flow based on token bucket mechanisms maintained for the first and second communication links or based on a fraction probability.

At step 910, the eNB receives the first fractional amount of the data flow from the UE via the first communication link.

At step 911, the eNB sends control information for the data flow to the UE either via the first communication link using a first RAT or the second communication link using the second RAT.

At step 912, the eNB determines whether a channel quality is below a threshold. If the channel quality is below the threshold, the eNB updates the determined first and/or second fractional amounts in step 914. Otherwise, at step 916, the eNB periodically evaluates the determination of the first and second fractional amounts of the data flow. In an aspect, the evaluation of the determination of the first and second fractional amounts of the data flow is performed by refraining from applying the determined first and second fractional amounts of the data flow when a prohibit timer is running and/or by refraining from applying the determined first and second fractional amounts of the data flow when a number of fractional allocation changes for a data flow exceeds a threshold within a certain time.

Figure 10A:
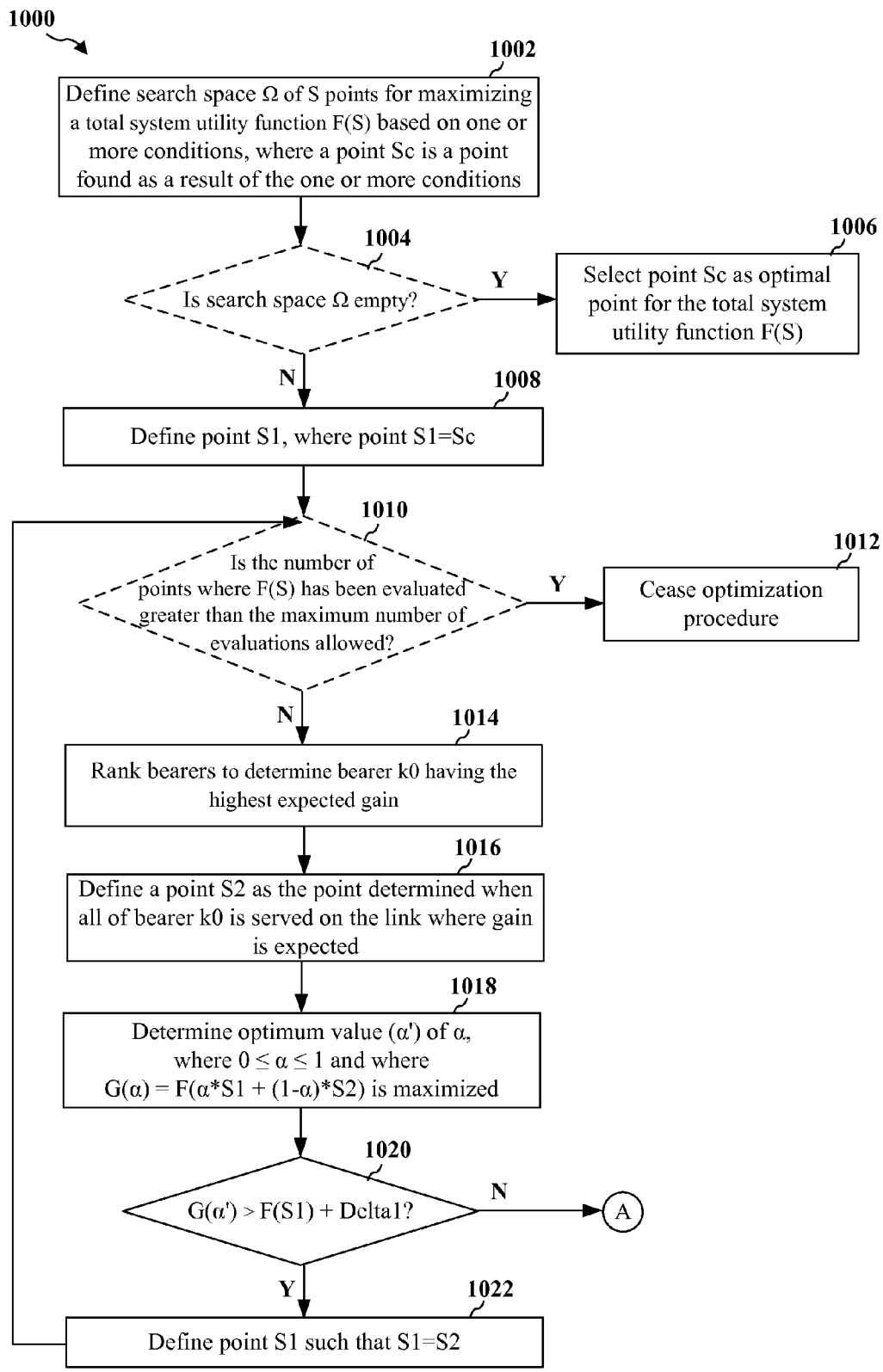
FIGS. 10A and 10B are a flow chart of a method of wireless communication in accordance with various aspects of the present disclosure.
Figure 10B:
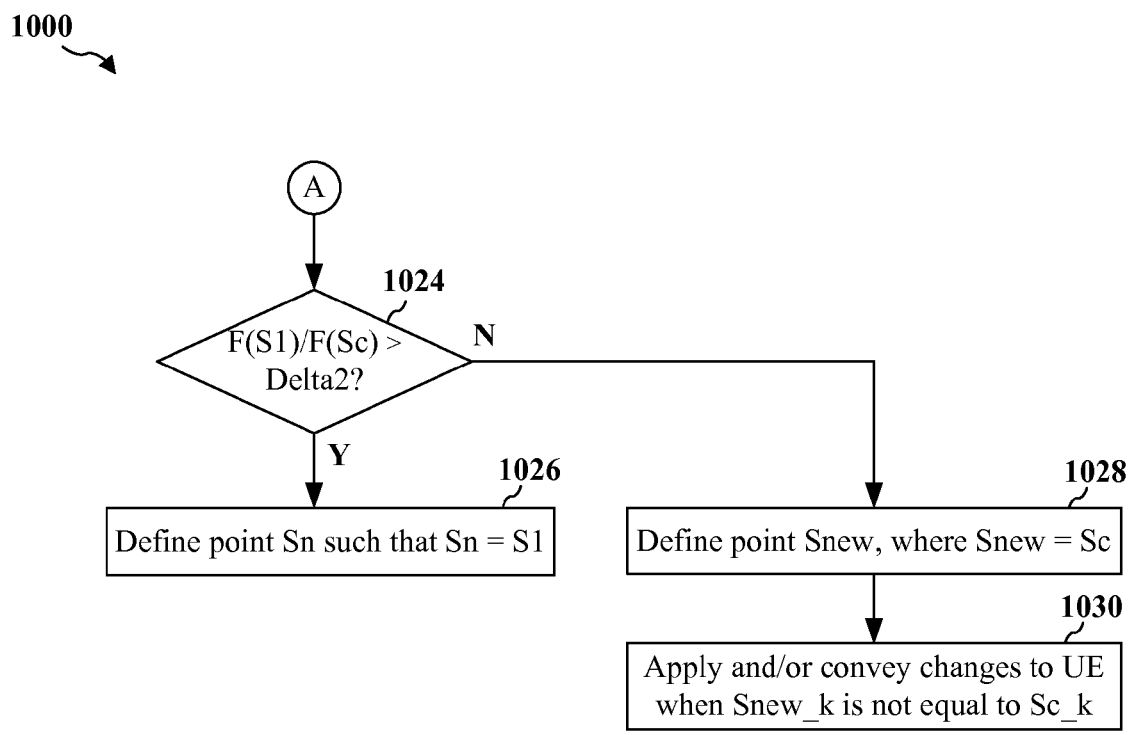

FIG. 10 is a flow chart 1000 of a method of wireless communication in accordance with various aspects of the present disclosure. The method may be performed by an eNB, such as eNB 705-a. At step 1002, the eNB defines Ω to represent the search space of points S to maximize a total system utility function F(S) based on one or more conditions and defines a point Sc to be the point found as result of one or more conditions. For example, the one or more conditions may include the conditions (a) through (d) discussed supra.

At step 1004, the eNB determines whether the search space Ω is empty. If the search space Ω is empty, then at step 1006, the eNB selects the point Sc as the optimal point for the total system utility function F(S). Otherwise, if the search space S2 is not empty, then at step 1008, the eNB applies an optimization procedure by defining a point S1, where S1=Sc.

At step 1010, the eNB determines whether the number of points where F(S) has been evaluated is greater than the maximum number of evaluations allowed (e.g., due to computational requirements). If the number of points where F(S) has been evaluated is greater than the maximum number of evaluations allowed, then at step 1012, the eNB ceases the optimization procedure. Otherwise, at step 1014, the eNB ranks various bearers based at least in part on an amount of expected system utility gained from splitting the bearers between WWAN link 746 and WLAN link 751. For example, the eNB may define k0 as the bearer where the most system utility gain is expected. In an aspect, the ranking for the system utility gain may be based on the following expression: (effective data rate delta between the WWAN link 746 and the WLAN link 751 for the current Sc)*(traffic volume for next interval)/(received throughput).

At step 1016, the eNB defines a point S2 as the point determined when all of bearer k0 is served on the link where gain is expected.

At step 1018, the eNB determines the optimum value of a (referred to as a'), where $0 \leq \alpha \leq 1$ and where $G(\alpha)=F(\alpha*S1+(1-\alpha)*S2)$ is maximized.

At step 1020, the eNB determines whether $G(\alpha')>F(S1)+$ Delta1. If $G(\alpha')>F(S1)+$Delta1, then at step 1022, the eNB defines the point S1, such that S1=S2. The eNB then returns to step 1010 of determining whether the number of points where F(S) has been evaluated is greater than the maximum number of evaluations allowed. Otherwise, at step 1024 shown in FIG. 10B, the eNB determines whether F(S1)/F(Sc)>Delta2. If F(S1)/F(Sc)>Delta2, then at step 1026, the eNB defines the point S1 for Sn. Otherwise, at step 1028, the eNB defines a point Snew, such that Snew=Sc. At step 1030, the eNB applies and/or conveys changes to the UE 715 when there are bearers for which Snew and Sc are different (i.e. Snew_k is not equal to Sc_k).

Figure 11:
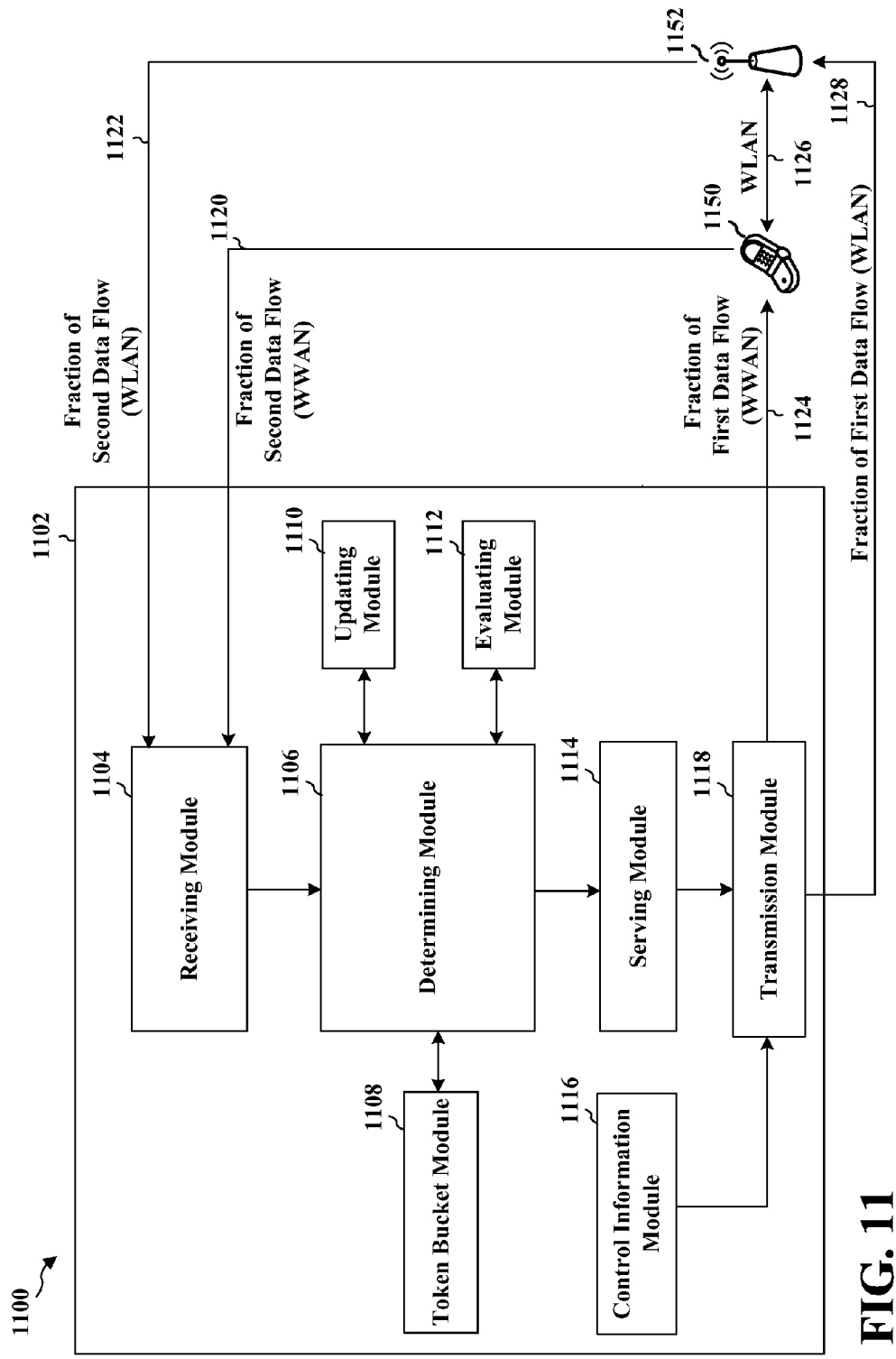
FIG. 11 is a conceptual data flow diagram illustrating the data flow between different modules/means/components in an exemplary apparatus in accordance with various aspects of the present disclosure.

FIG. 11 is a conceptual data flow diagram 1100 illustrating the data flow between different modules/means/components in an exemplary apparatus 1102 in accordance with various aspects of the present disclosure. The apparatus may be an eNB. The apparatus includes a module 1104 that receives WWAN UL transmissions (e.g., a third fractional amount 1120 of a second data flow from a UE, such as UE 1150) via a first communication link. The module 1104 may further receive feedback information for the first data flow from a WLAN AP 1152 (e.g., WLAN AP 705-b) and/or from the UE either via the first communication link using a first RAT (e.g., a WWAN, such as LTE) or the second communication link using the second RAT (e.g., a WLAN, such as WiFi™). The apparatus further includes a module 1106 that determines a first fractional amount 1124 of a first data flow to be served to the UE via the first communication link using the first RAT, determines a second fractional amount 1128 of the first data flow to be served to the UE via the second communication link (e.g., WLAN link 1126) using a second RAT, determines the third fractional amount 1120 of the second data flow to be sent by the UE via the first communication link using the first RAT, determines a fourth fractional amount 1122 of the second data flow to be sent by the UE via the second communication link 1126 using the second RAT, and determines whether a channel quality is below a threshold, a module 1108 that implements the determined first and second fractional amounts of the first data flow based on a token bucket maintained for the first and second communication links or based on a fraction probability, a module 1110 that updates the determined third and fourth fractional amounts when the channel quality is below the threshold, a module 1112 that periodically evaluates the determination of the first and second fractional amounts of the first data flow and/or the determination of the third and fourth fractional amounts of the second data flow, a module 1114 that serves the first fractional amount of the first data flow to the UE using the first communication link, a module 1116 that sends and receives control information to and from the UE via the first communication link using a first RAT, or sends and receives the control information to the UE via the second communication link using the second RAT, and a module 1118 that transmits WWAN DL transmissions to the UE. In an aspect, the module 1118 transmits a message to the UE to send the third fractional amount of the second data flow via the first communication link using the first RAT and to send the fourth fractional amount of the second data flow via the second communication link using the second RAT.

The apparatus may include additional modules that perform each of the steps of the algorithm in the aforementioned flow chart of FIGS. 8, 9, 10A, and 10B. As such, each step in the aforementioned flow chart of FIGS. 8, 9, 10A, and 10B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
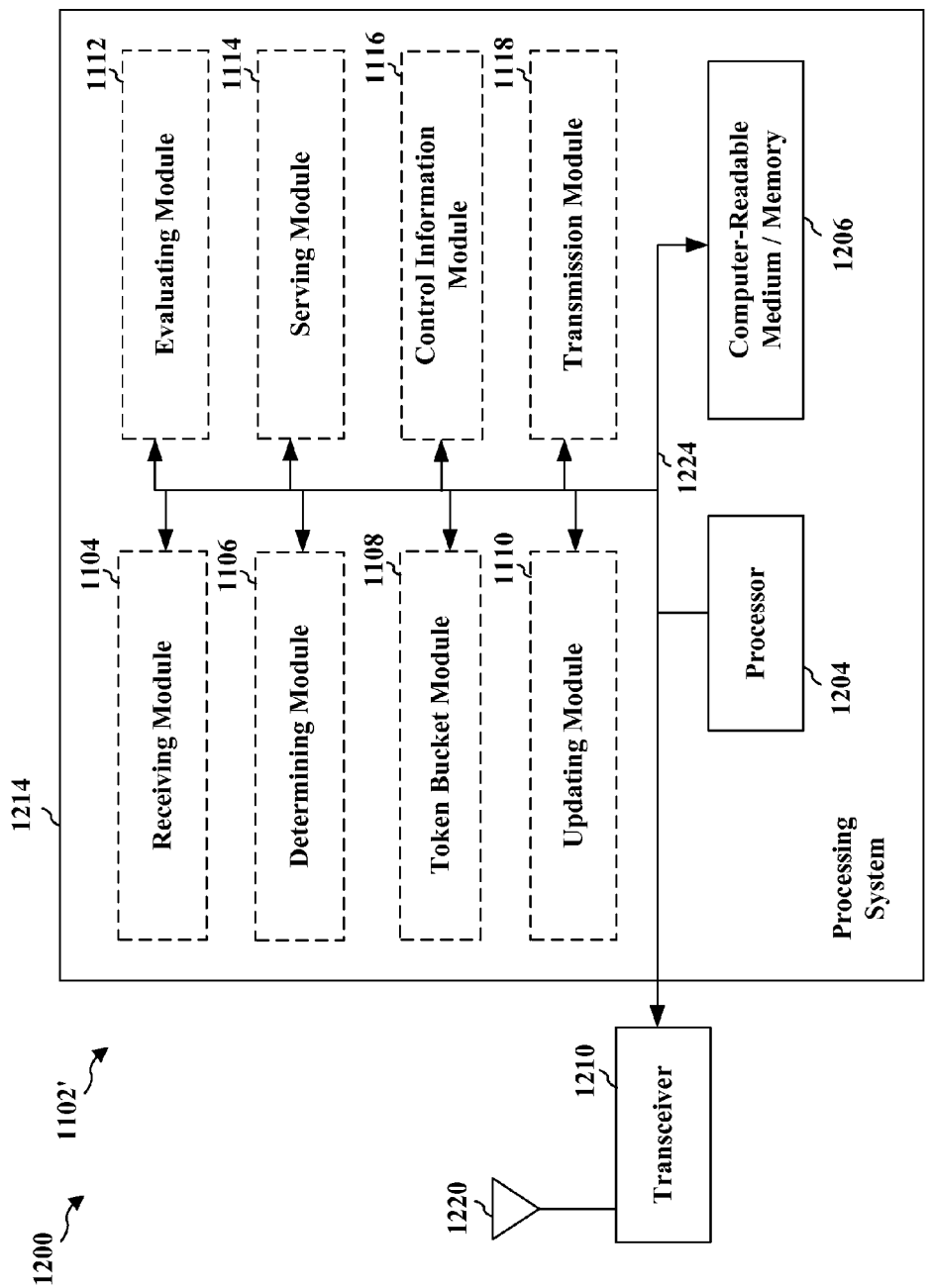
FIG. 12 is a diagram illustrating an example of a hardware implementation for an apparatus employing a processing system in accordance with various aspects of the present disclosure.

FIG. 12 is a diagram 1200 illustrating an example of a hardware implementation for an apparatus 1102' employing a processing system 1214 in accordance with various aspects of the present disclosure. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, 1116, and 1118, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1118, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, 1112, 1114, 1116, and 1118. The modules may be software modules running in the processor 1204, resident/stored in the computer readable medium/memory 1206, one or more hardware modules coupled to the processor 1204, or some combination thereof. The processing system 1214 may be a component of the eNB 610 and may include the memory 676 and/or at least one of the TX processor 616, the RX processor 670, and the controller/processor 675.

In one configuration, the apparatus 1102/1102' for wireless communication includes means for determining a first fractional amount of a first data flow to be served to a UE via a first communication link using a first RAT, means for determining a second fractional amount of the first data flow to be served to the UE via a second communication link using a second RAT, means for serving the first fractional amount of the first data flow to the UE using the first communication link, means for receiving feedback information for the first data flow from a WLAN AP (e.g., WLAN AP 705-b) and/or from the UE either via the first communication link using a first RAT or the second communication link using the second RAT, means for sending control information to the UE via the first communication link using a first RAT without using the second RAT, or sending the control information to the UE via the second communication link using the second RAT without using the first RAT, means for determining a third fractional amount of a second data flow to be sent by the UE via the first communication link using the first RAT, means for determining a fourth fractional amount of the second data flow to be sent by the UE via the second communication link using the second RAT, means for receiving the third fractional amount of the second data flow from the UE via the first communication link, means for determining whether a channel quality is below a threshold, means for updating the determined third and fourth fractional amounts when the channel quality is below the threshold, means for periodically evaluating the determination of the first and second fractional amounts of the first data flow, and/or the determination of the third and fourth fractional amounts of the second data flow, means for transmitting a message to the UE to send the third fractional amount of the second data flow via the first communication link using the first RAT and to send the fourth fractional amount of the second data flow via the second communication link using the second RAT, and means for implementing the determined first and second fractional amounts of the first data flow and third and fourth fractional amounts of the second data flow based on token bucket mechanisms maintained for the first and second communication links or based on a fraction probability. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   determining, by a base station, a first fractional amount of a first data flow to be transmitted by a user equipment (UE) via a first communication link using a first radio access technology (RAT);
   determining, by the base station, a second fractional amount of the first data flow to be transmitted by the UE via a second communication link using a second RAT;
   transmitting, by the base station using the first RAT, control information to configure the UE to transmit the first fractional amount of the first data flow via the first communication link using the first RAT and the second fractional amount of the first data flow via the second communication link using the second RAT; and
   performing, by the base, at least one of:
      refraining from applying the determined first and second fractional amounts of the first data flow when a prohibit timer is running, or
      refraining from applying the determined first and second fractional amounts of the first data flow when a number of fractional allocation changes for a data flow exceeds a threshold within a certain time.

2. The method of claim 1, wherein at least one of the first fractional amount of the first data flow or the second fractional amount of the first data flow is determined based on a configuration or an optimization function.

3. The method of claim 2, wherein the optimization function is based on at least one of:
   an assignment of data flows to a communication link,
   a channel condition of each of the first RAT and the second RAT,
   a traffic condition of each of the first RAT and the second RAT,
   a resource of the first RAT and the second RAT,
   a channel load of the first communication link and the second communication link, or
   a difference between data rates and latencies on the first communication link and the second communication link.

4. The method of claim 1, further comprising:
   transmitting, by the base station, the control information to the UE via the first communication link using the first RAT.

5. The method of claim 1, wherein the control information comprises at least one of: one or more radio resource control (RRC) messages, one or more radio link control (RLC) messages, or one or more Packet Data Convergence Protocol (PDCP) status messages.

6. The method of claim 1, further comprising:
   receiving, by the base station, feedback information for the first data flow from the UE via the first communication link using the first RAT.

7. The method of claim 6, wherein the feedback information comprises at least one feedback message containing UE measurements and second RAT measurements.

8. The method of claim 1, wherein the first and second fractional amounts of the first data flow are based on an optimization of a system utility.

9. The method of claim 1, wherein the first data flow comprises uplink traffic.

10. The method of claim 1, further comprising:
    determining whether a channel quality is below a threshold; and
    updating the determined first and second fractional amounts when the channel quality is below the threshold.

11. The method of claim 1, further comprising periodically evaluating the determination of the first and second fractional amounts of the first data flow.

12. The method of claim 11, wherein evaluating the determination of the first and second fractional amounts of the first data flow comprises:
   optimizing a difference of effective data rates and latencies between the first and second RATs for a bearer served on both the first and second communication links.

13. The method of claim 1, wherein the determination of the first fractional amount of the first data flow is one and the determination of the second fractional amount of the first data flow is zero when a lowest modulation and coding scheme (MCS) cannot be selected for the second communication link.

14. A base station for wireless communication, comprising:
   means for determining a first fractional amount of a first data flow to be transmitted by a user equipment (UE) via a first communication link using a first radio access technology (RAT);
   means for determining a second fractional amount of the first data flow to be transmitted by the UE via a second communication link using a second RAT;
   means for transmitting, using the first RAT, control information to configure the UE to transmit the first fractional amount of the first data flow via the first communication link using the first RAT and the second fractional amount of the first data flow via the second communication link using the second RAT; and
   means for performing at least one of:
      refraining from applying the determined first and second fractional amounts of the first data flow when a prohibit timer is running, or
      refraining from applying the determined first and second fractional amounts of the first data flow when a number of fractional allocation changes for a data flow exceeds a threshold within a certain time.

15. The base station of claim 14, wherein at least one of the first fractional amount of the first data flow or the second fractional amount of the first data flow is determined based on:
   a configuration; or
   an optimization function based on at least one of:
      an assignment of data flows to a communication link,
      a channel condition of each of the first RAT and the second RAT,
      a traffic condition of each of the first RAT and the second RAT,
      a resource of the first RAT and the second RAT,
      a channel load of the first communication link and the second communication link, or
      a difference between data rates and latencies on the first communication link and the second communication link.

16. The base station of claim 14, further comprising:
   means for transmitting the control information to the UE via the first communication link using the first RAT.

17. The base station of claim 14, further comprising:
   means for receiving feedback information for the first data flow from the UE via the first communication link using the first RAT.

18. The base station of claim 14, further comprising:
   means for determining whether a channel quality is below a threshold; and
   means for updating the determined first and second fractional amounts when the channel quality is below the threshold.

19. The base station of claim 14, further comprising means for periodically evaluating the determination of the first and second fractional amounts of the first data flow.

20. The base station of claim 14, wherein the determination of the first fractional amount of the first data flow is one and the determination of the second fractional amount of the first data flow is zero when a lowest modulation and coding scheme (MCS) cannot be selected for the second communication link.

21. A base station for wireless communication, comprising:
   a memory; and
   at least one processor coupled to the memory, wherein the at least one processor is configured to:
      determine a first fractional amount of a first data flow to be transmitted by a user equipment (UE) via a first communication link using a first radio access technology (RAT);
      determine a second fractional amount of the first data flow to be transmitted by the UE via a second communication link using a second RAT;
      transmit, using the first RAT, control information to configure the UE to transmit the first fractional amount of the first data flow via the first communication link using the first RAT and the second fractional amount of the first data flow via the second communication link using the second RAT; and
      perform at least one of:
         refrain from applying the determined first and second fractional amounts of the first data flow when a prohibit timer is running, or
         refrain from applying the determined first and second fractional amounts of the first data flow when a number of fractional allocation changes for a data flow exceeds a threshold within a certain time.

22. A non-transitory computer-readable medium having instructions stored thereon that, when executed, cause at least one base station to:
   determine a first fractional amount of a first data flow to be transmitted by a user equipment (UE) via a first communication link using a first radio access technology (RAT);
   determine a second fractional amount of the first data flow to be transmitted by the UE via a second communication link using a second RAT;
   transmit, using the first RAT, control information to configure the UE to transmit the first fractional amount of the first data flow via the first communication link using the first RAT and the second fractional amount of the first data flow via the second communication link using the second RAT; and
   perform at least one of:
      refrain from applying the determined first and second fractional amounts of the first data flow when a prohibit timer is running, or
      refrain from applying the determined first and second fractional amounts of the first data flow when a number of fractional allocation changes for a data flow exceeds a threshold within a certain time.

23. A method of wireless communication, comprising:
   determining, by a base station, a first fractional amount of a first data flow to be served to a user equipment (UE) via a first communication link using a first radio access technology (RAT);
   determining, by the base station, a second fractional amount of the first data flow to be served to the UE via a second communication link using a second RAT;

serving, by the base station, the first fractional amount of the first data flow to the UE via the first communication link using the first RAT; and performing, by the base station, at least one of:
refraining from applying the determined first and second fractional amounts of the first data flow when a prohibit timer is running, or
refraining from applying the determined first and second fractional amounts of the first data flow when a number of fractional allocation changes for a data flow exceeds a threshold within a certain time.

24. The method of claim 23, wherein the determination of the first fractional amount of the first data flow is one and the determination of the second fractional amount of the first data flow is zero when a lowest modulation and coding scheme (MCS) cannot be selected for the second communication link.

25. The method of claim 23, further comprising periodically evaluating the determination of the first and second fractional amounts of the first data flow.

26. A base station for wireless communication, comprising:
means for determining a first fractional amount of a first data flow to be served to a user equipment (UE) via a first communication link using a first radio access technology (RAT);
means for determining a second fractional amount of the first data flow to be served to the UE via a second communication link using a second RAT;
means for serving the first fractional amount of the first data flow to the UE via the first communication link using the first RAT; and
means for performing at least one of:
refraining from applying the determined first and second fractional amounts of the first data flow when a prohibit timer is running, or
refraining from applying the determined first and second fractional amounts of the first data flow when a number of fractional allocation changes for a data flow exceeds a threshold within a certain time.

27. The base station of claim 26, wherein the determination of the first fractional amount of the first data flow is one and the determination of the second fractional amount of the first data flow is zero when a lowest modulation and coding scheme (MCS) cannot be selected for the second communication link.

28. The base station of claim 26, further comprising:
means for periodically evaluating the determination of the first and second fractional amounts of the first data flow.

29. A base station for wireless communication, comprising:
a memory; and
at least one processor coupled to the memory, wherein the at least one processor is configured to:
determine a first fractional amount of a first data flow to be served to a user equipment (UE) via a first communication link using a first radio access technology (RAT);
determine a second fractional amount of the first data flow to be served to the UE via a second communication link using a second RAT;
serve the first fractional amount of the first data flow to the UE via the first communication link using the first RAT; and
perform at least one of:
refrain from applying the determined first and second fractional amounts of the first data flow when a prohibit timer is running, or
refrain from applying the determined first and second fractional amounts of the first data flow when a number of fractional allocation changes for a data flow exceeds a threshold within a certain time.

30. A non-transitory computer-readable medium having instructions stored thereon that, when executed, cause at least one base station to:
determine a first fractional amount of a first data flow to be served to a user equipment (UE) via a first communication link using a first radio access technology (RAT);
determine a second fractional amount of the first data flow to be served to the UE via a second communication link using a second RAT;
serve the first fractional amount of the first data flow to the UE via the first communication link using the first RAT; and
perform at least one of:
refrain from applying the determined first and second fractional amounts of the first data flow when a prohibit timer is running, or
refrain from applying the determined first and second fractional amounts of the first data flow when a number of fractional allocation changes for a data flow exceeds a threshold within a certain time.

* * * * *